United States Patent [19]

Abodishish

[11] Patent Number: 4,873,072

[45] Date of Patent: Oct. 10, 1989

[54] RECOVERY OF HAFNIUM VALUES FROM LOADED EXTRACTION SOLVENT

[75] Inventor: Hani A. Abodishish, Ogden, Utah

[73] Assignee: Westinghouse Electric Corp., Pittsburgh, Pa.

[21] Appl. No.: 240,184

[22] Filed: Sep. 2, 1988

[51] Int. Cl.$^4$ ............................................. C01G 27/02
[52] U.S. Cl. .................................... 423/608; 423/70; 423/DIG. 14; 210/688
[58] Field of Search ................. 423/70, 608, DIG. 14; 210/688

[56] References Cited

U.S. PATENT DOCUMENTS

| | | | |
|---|---|---|---|
| 2,938,769 | 5/1960 | Overholser et al. | 423/70 |
| 3,006,719 | 10/1961 | Miller | 423/70 |
| 3,069,232 | 7/1962 | Greenberg et al. | 423/70 |
| 3,346,330 | 6/1967 | de Calmes et al. | 423/608 |

FOREIGN PATENT DOCUMENTS 892764  3/1962  United Kingdom ................. 423/70

OTHER PUBLICATIONS

Stickney, William A., "Zirconium–Halfnium Separation", Bureau of Mines Report of Investigations 5499, 1959.

*Primary Examiner*—Robert L. Stoll
*Attorney, Agent, or Firm*—R. A. Stoltz

[57] ABSTRACT

In the production of a highly pure hafnium oxide by calcination of a highly pure hafnium hydroxide, the production of a highly pure hafnium hydroxide from a hafnium-loaded, methyl isobutyl ketone solvent that is substantially free of zirconium and sulfate ions by adding ammonia to such solvent to produce a three-layered reaction product having MIBK solvent on top, ammonium thiocyanate solution in the middle, and a highly pure hafnium hydroxcide sludge at the bottom which is separately removed, freed of water, and calcined.

7 Claims, 1 Drawing Sheet

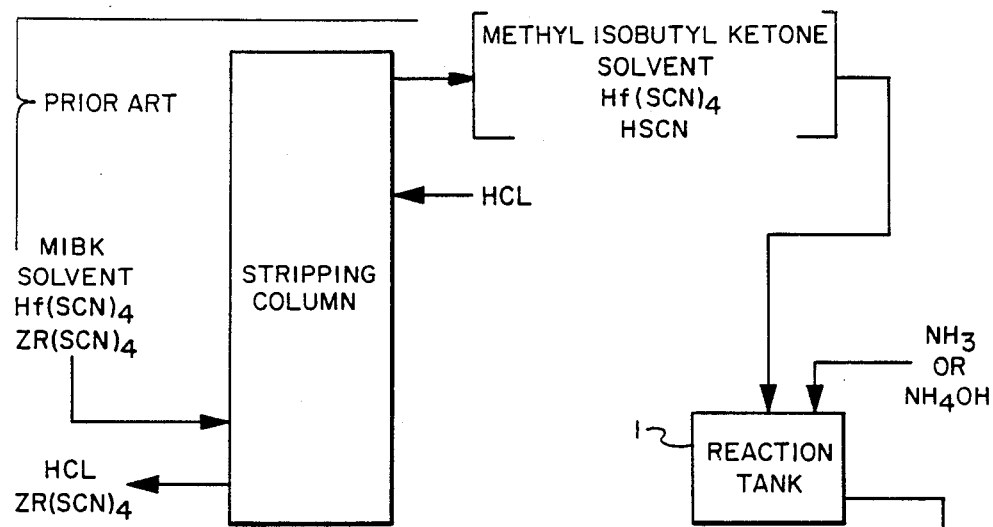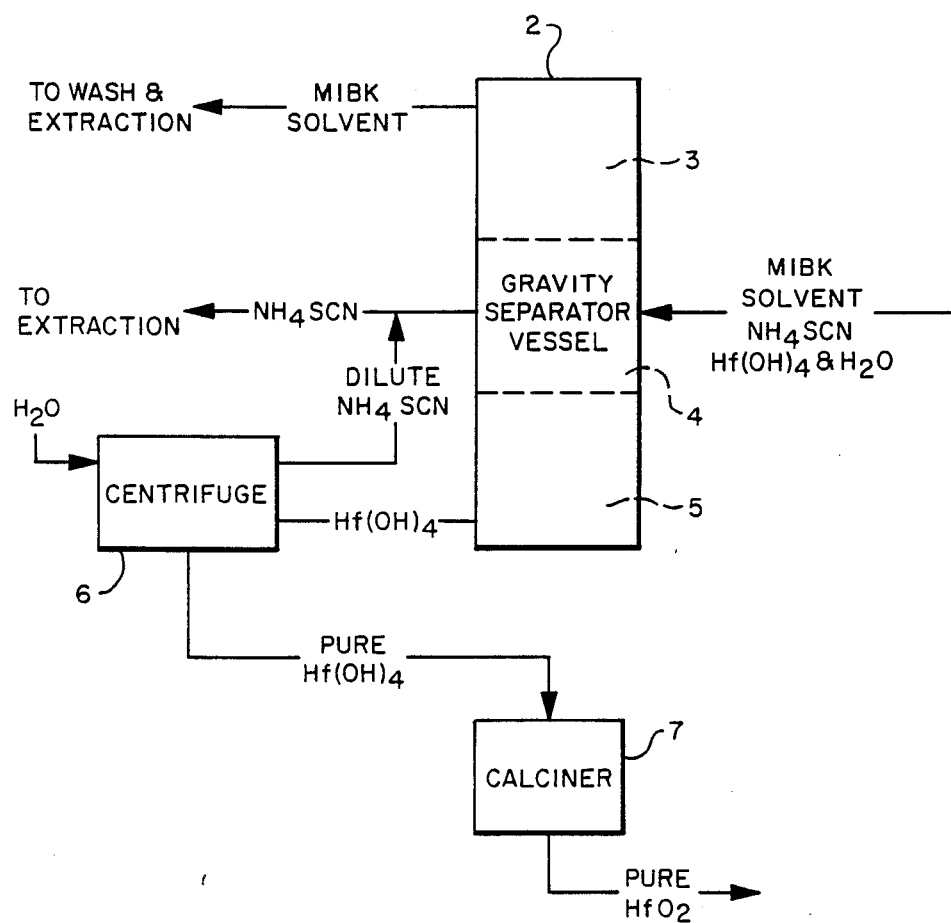

RECOVERY OF HAFNIUM VALUES FROM LOADED EXTRACTION SOLVENT

BACKGROUND OF THE INVENTION

1. Field of the Invention

The invention is in the field of production of high purity hafnium oxide as carried out by the treatment of a substantially zirconium-free, hafnium-loaded, organic solvent derived by solvent extraction techniques attributable to Fischer et al. as described in Z. Anorg-chemistry 255, pages 79–100 and 277–286 (1947), which is referred to in U.S. Pat. Nos. 3,006,719 and 3,069,232 along with an improvement therein by which methyl isobutyl ketone (MIBK) is used instead of ether as an extractant for the hafnium values.

2. Description of the Prior Art

In the derivation and treatment of a substantially zirconium-free, hafnium-loaded, organic solvent by the improved Fischer et al. process for the recovery of high purity hafnium oxide it is usual practice to strip the hafnium-loaded MIBK organic solvent with a sulfuric acid solution and to treat the resulting extract phase with ammonia to precipitate hafnium hydroxide. The precipitate is then calcined to produce the desired high purity hafnium oxide.

This process was allegedly further improved by stripping the loaded solvent with a saturated aqueous solution of ammonium sulfate containing some sulfuric acid, the extract phase containing thiocyanic acid, ammonium sulfate, and the hafnium values in the form of hafnium thiocyanate. Such extract phase is then treated with gaseous ammonia, which reacts with the thiocyanic acid and hafnium thiocyanate to simultaneously form ammonium thiocyanate and hafnium hydroxide. This is said to be of the utmost importance in co-precipitating ammonium sulfate with the hafnium hydroxide to make the hafnium hydroxide easily filterable, see the aforementioned Greenberg et al., U.S. Pat. No. 3,069,232 of Dec. 18, 1962 entitled "Recovery of Hafnium Values." However, not only is the sulfate ion present, but the sulfuric acid introduced into the ammonium sulfate extractant to ensure recovery of the major portion of the thiocyanic acid in the extract phase, contaminates the extract phase and requires additional purification steps.

SUMMARY OF THE INVENTION

In accordance with the present invention, the usual sulfuric acid stripping of the hafnium-loaded, organic solvent is completely eliminated, as is any stripping of such organic solvent and any introduction of sulfate ions. Rather, the hafnium-loaded, organic solvent is kept entirely free of sulfate ions by direct reaction with either anhydrous or aqueous ammonia. This has been found to produce an easily separable, three-layered, reaction product according to the differing specific gravities of the several constituents, the bottom layer being a hafnium hydroxide sludge, i.e., precipitate of hafnium hydroxide solids, the middle layer an ammonium thiocyanate solution, and the top layer regenerated solvent.

Separation of the three layers is accomplished by permitting the top layer of regenerated solvent to overflow from either the reaction vessel or a separation vessel into which the reaction product is passed. The middle layer of ammonium thiocyanate solution is then easily separated from the bottom layer of precipitated hafnium hydroxide solids by decantation. The precipitated solids are removed, dried, and calcined to produce the desired high quality hafnium oxide as an end product of the process.

Significant advantages are achieved by the present process. Sulfate ion impurities are completely eliminated, along with the usual washing previously necessary and the usual corrosion of equipment. In commercial production utilizing the invention as compared with that employing the usual sulfuric acid stripping of the organic solvent or the use of ammonium sulfate as the stripping agent, scrubbing columns and associated control and pumping equipment are eliminated, as are the customary hafnium steam stripper and associated equipment. Moreover, a superior quality hafnium oxide is produced at lower cost.

BRIEF DESCRIPTION OF THE DRAWING

The best mode presently contemplated for carrying out the invention in actual practice is shown in the accompanying drawing, in which the single FIGURE is a flow sheet of the inventive procedure applied to a hafnium-loaded, methyl isobutyl ketone organic solvent produced by application of the Fischer et al. process, as initially improved, to a zirconium-hafnium ore material.

DETAILED DESCRIPTION OF THE ILLUSTRATED EMBODIMENT

In the form illustrated, the process of the invention is applied to the usual methyl isobutyl ketone organic solvent containing hafnium thiocyanate and thiocyanic acid, but no sulfate ions, which organic solvent is obtained in customary manner as the extract phase of stripping, with hydrochloric acid, a column of MIBK solvent containing hafnium thiocyanate and zirconium thiocyanate, see the portion of the flowsheet designated as "prior art."

Instead of applying further liquid-liquid extraction techniques, as customary, by stripping the MIBK solvent extract phase containing the hafnium thiocyanate and the thiocyanic acid with sulfuric acid, or, according to Greenberg et al., with ammonium sulfate as the extractant along with some sulfuric acid, such MIBK solvent extract phase, still free of sulfate ions, is mixed directly with either anhydrous ammonia or aqueous ammonia in a suitable reaction vessel, such as a tank 1, from which the reaction product (MIBK organic solvent containing ammonium thiocyanate, hafnium hydroxide, and water) is run immediately into one or more gravity separation vessels, such as the vessel 2, for gravity separation into three layers, the upper layer 3 being the MIBK solvent, which is permitted to overflow, as indicated, for subsequent washing and extraction of any residual hafnium values and/or ammonium thiocyanate in customary manner, the middle layer 4 being ammonium thiocyanate solution, which is decanted for subsequent extraction of any residual hafnium values also in customary manner, and the bottom layer 5 being a hafnium hydroxide sludge or precipitate, which is washed and filtered or centrifuged, as in a centrifuge 6, prior to being passed into a usual calciner 7 for producing the desired product of the process, a pure hafnium oxide ($HfO_2$).

Dilute ammonium thiocyanate solution from the filter or centrifuge is preferably recirculated to the ammonium thiocyanate extraction step.

The process has been carried out on a laboratory basis.

Six samples of zirconium and sulfate-ion-free solvents, each 100 milliliters, loaded with hafnium ions in the form of hafnium thiocyanate, $Hf(SCN)_4$, and containing thiocyanic acid, HSCN, were treated with varying quantities, respectively, of aqueous ammonia, $NH_4OH$, at different times in a reaction vessel by adding the ammonia thereto to immediately produce a reaction product.

In each instance, the reaction product was multilayered, based on the differing specific gravities of the several constituents. The lightest constituent was the MIBK solvent, which was overflowed from the reaction vessel, washed twice with distilled water, and then titrated for thiocyanate, SCN. The next lightest constituent making up the middle layer was ammonium thiocyanate, $NH_4SCN$, which was decanted from the reaction vessel and titrated for thiocyanate. The heaviest constituent making up the bottom layer was a hafnium hydroxide, $Hf(OH)_4$, sludge, which was removed from the reaction vessel and, after the addition of water, was centrifuged to separate the liquid from the precipitated hafnium hydroxide solids. The solids were dried and calcined to produce a highly pure hafnium oxide, $HfO_2$.

In these experimental runs of the process, from 15 to 50 mls of the ammonium hydroxide (aqueous ammonia) were employed. The optimum quantity for the production of distinct layers was found to be 30 mls with a controlled pH of 8.5. The concentration of thiocyanate in the feed was measured at 2.43M. The overflowed layer of MBIK solvent, when washed twice with 50 mls of distilled water and titrated for thiocyanate, showed only 0.0015M concentration of thiocyanate. Titration of the decanted ammonium thiocyanate showed 7.3M concentration of thiocyanate.

Analysis of the hafnium oxide produced by calcination of the precipitated hafnium hydroxide solids part of the withdrawn bottom layer sludge approximated in parts per million in each instance the amounts shown in the first column of the following table, the second column showing comparative analysis of a typical $HfO_2$ product obtained by use of the MIBK Fisher et al. process as normally used industrially:

|     | Process of the Invention (parts per million) | Presently used Process (parts per million) |
| --- | --- | --- |
| Zr  | 513 | 22,850 |
| Al  | 166 | 427 |
| Fe  | 124 | 11,530 |
| Mg  | 95  | 609 |
| Si  | 69  | 2,080 |
| Ti  | 3,200 | 2,840 |
| SO4 | 0   | 13,300 |

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim as my invention:

1. In a process for recovering high purity hafnium hydroxide from a methyl isobutyl ketone organic solvent that is substantially free of sulfate ions and contains hafnium thiocyanate and thiocyanic acid, the improvement comprising reacting said organic solvent with ammonia to produce a reaction product in the form of a methyl isobutyl ketone organic solvent that is substantially free of sulfate ions and contains ammonium thiocyanate solution and hafnium hydroxide; separating the constituents of said reaction product in accordance with their respective specific gravities to produce a hafnium hydroxide sludge as one of the separation products; and removing the liquid component of said sludge to yield a high purity hafnium hydroxide ready for calcination to hafnium oxide.

2. A process according to claim 1, wherein the ammonia is anhydrous.

3. A process according to claim 1, wherein the ammonia is aqueous.

4. A process according to claim 1, wherein the constituents of the reaction product are separated by permitting said reaction product to settle in a settlement vessel so that the hafnium hydroxide sludge forms a bottom layer, the organic solvent an upper layer, and the ammonium thiocyanate solution a middle layer.

5. A process according to claim 4, wherein the upper layer of organic solvent is overflowed from the settlement vessel and the middle layer of ammonium thiocyanate solution is decanted from the settlement vessel.

6. A process according to claim 1, wherein the liquid component of the hafnium hydroxide sludge is removed by filtering said sludge.

7. A process according to claim 1, wherein the liquid component of the hafnium hydroxide sludge is removed by centrifuging said sludge.

* * * * *